(12) United States Patent
Hansen et al.

(10) Patent No.: US 8,032,319 B1
(45) Date of Patent: Oct. 4, 2011

(54) METHODS FOR ANALYZING STREAMING COMPOSITE WAVEFORMS

(75) Inventors: Carl Hal Hansen, Orem, UT (US);
Stephen R. Lindsey, Lehi, UT (US);
Christopher E. Spencer, Riverton, UT (US); James Bryant Hansen, Pleasant Grove, UT (US); Richard C. Lindsey, Payson, UT (US); Karl G. Merkley, Lindon, UT (US)

(73) Assignee: Hal Enterprises, LLC, Orem, UT (US)

( * ) Notice: Subject to any disclaimer, the term of this patent is extended or adjusted under 35 U.S.C. 154(b) by 271 days.

(21) Appl. No.: 12/165,349

(22) Filed: Jun. 30, 2008

Related U.S. Application Data

(60) Provisional application No. 60/947,307, filed on Jun. 29, 2007.

(51) Int. Cl.
*G06F 11/00* (2006.01)
*G06F 15/00* (2006.01)

(52) U.S. Cl. ............... 702/75; 702/66; 702/70; 702/74; 703/13

(58) Field of Classification Search ............... 702/75, 702/66, 70, 74
See application file for complete search history.

(56) References Cited

U.S. PATENT DOCUMENTS

| | | | | |
|---|---|---|---|---|
| 4,680,777 | A * | 7/1987 | Saha | 375/280 |
| 6,862,558 | B2 | 3/2005 | Huang | |
| 7,039,122 | B2 * | 5/2006 | Dragonetti | 375/295 |
| 2008/0316076 | A1 * | 12/2008 | Dent et al. | 341/144 |

* cited by examiner

*Primary Examiner* — Hal D Wachsman
(74) *Attorney, Agent, or Firm* — Durham Jones & Pinegar Intellectual Property Law Group

(57) ABSTRACT

Methods for signal processing employ instantaneous frequency analysis through quadrature genometric measurement of streaming signal data. Such methods may include the analysis of any composite analog periodic signal, including but not limited to audio, video, radio, seismic, light, radar, sonar, EKG, where signal data is streaming, stationary or non-stationary, and represents either linear or non-linear processes.

16 Claims, 11 Drawing Sheets

Composite Wave

METHODS FOR ANALYZING STREAMING COMPOSITE WAVEFORMS

CROSS-REFERENCE TO RELATED APPLICATION

Pursuant to the provisions of 35 U.S.C. §119(e), this application claims the benefit of the filing date of provisional patent application Ser. No. 60/947,307, filed Jun. 29, 2007, for "METHODS FOR INSTANTANEOUS FREQUENCY ANALYSIS," the entire disclosure of which is, by this reference, hereby incorporated herein.

FIELD OF THE INVENTION

The present invention relates to methods for signal processing. More particularly, the present invention relates to instantaneous frequency analysis through quadrature geometric measurement of streaming signal data. The present invention is concerned with the analysis of any composite analog periodic signal, including but not limited to audio, video, radio, seismic, light, radar, sonar, EKG, where signal data is streaming, stationary, or non-stationary, and represents either linear or non-linear processes.

BACKGROUND

The field of signal processing is concerned with the analysis, interpretation and manipulation of signals. Many technologies employ various techniques of signal processing on sound, images, biological signals such as EKG, radar signals, and many other types of signals in order to store and reconstruct signals, separate valid information from noise (e.g., water, air, land craft identification by radar or sonar), compress (e.g., video or audio compression), and perform feature extraction (e.g., speech-to-text conversion). The current methods of signal processing technology may be sufficient for some signals. However, they are incapable of accurately analyzing signals that contain data sets where (1) the total data set is too short, (2) the data is non-stationary, and (3) the data represents a nonlinear process.

In signal processing technology, it is necessary to decompose composite waveforms representing the transmission of data. The traditional methods for transmitting data rely on a two-dimensional display usually in the form of a sine wave, modified to contain data. Data may be stored by modulating the amplitude, frequency, phase or a combination of the foregoing.

Referring to FIG. 1A, a traditional view of a waveform 10 is shown, having variations in amplitude over time. It is formed by combining waves of multiple frequencies 12 and 14, as shown in FIGS. 1B and 1C. Such two-dimensional representations do not fully represent what is happening with a three-dimensional waveform, and are not adequate for completely analyzing a composite waveform 20, as shown in FIG. 2.

Historically, researchers have used Fourier transforms to analyze signals. As a result, the term "spectrum" has become almost synonymous with the Fourier transform of the data. A Fourier analysis transforms the time data into the frequency domain, selects windows of data and resolves the fundamental waveforms that compose the wave. However, Fourier originally intended for his transform to be used on signals that are harmonically related if data does not continue infinitely. Current adaptations of Fourier's transform are not able to necessarily make these same assumptions. As a result, data extracted using this method may not be accurately represented.

Most real world composite waveforms involve signals that are not periodic, predictable, linear, or harmonically related. For example, speech is constantly changing in frequency, amplitude and tone and thus requires precise formant tracking over time of streaming signal data. Accordingly, the audio signal must instantly be broken down into its varying formant frequencies and tracked over time to accurately determine what is being said. Spectral analysis may provide an idea of what the formants are in a particular sound clip in a window sample, but it cannot describe exactly what frequencies were doing at each point in time, that is from sample to sample.

In an attempt to minimize the limitations of the Fourier Transform, new methods have been developed. These methods include, but are not limited to, Fast Fourier Transform (FFT, IFT), Short-Time Fourier Transform (STFT), Wavelet Analysis (including Chirplet Transform), Empirical Orthogonal Function Expansion (EOF, PCA, SVD), and others. Although these methods have improved the process of spectral signal analysis, they still fall short of the needed flexibility and resolution for specific signal analysis applications.

Recently, a type of spectral analysis has begun to evolve, sometimes referred to as Instantaneous Frequency Analysis or IFA. The premise behind Instantaneous Frequency Analysis is to analyze waveforms converted to digital form at each sample point in time, rather than using a time window as is done in the Fourier Transform. It is expected that this approach will provide a more accurate representation of the makeup of composite signals than the traditional spectral analysis would allow, even under the harshest conditions where data is non-linear, non-stationary, and too short to properly analyze using traditional methods. In the IFA approach, the Fourier Transform is used very little if any.

One example of IFA technology is shown in U.S. Pat. No. 6,862,558 (Huang), in which an acoustical signal is decomposed into a set of "intrinsic mode functions" (IMFs), that are then transformed into the Hilbert spectrum for analysis. The Huang process uses approximation methods to develop IMFs, based on determining the mean of maximum and minimum points of a composite waveform. This approximation approach may not be sufficiently precise for many applications. Moreover, the Huang process does not appear to be able to sense phase shifting of signals, detect peaks in signal components, or distinguish between frequencies less than 2.5 to 1 in frequency relation because these composite waves appear as a single amplitude modulated waveform.

Accordingly, there is a need for methods to instantaneously and precisely analyze composite waveforms, such as real time acoustical signals, for use in a great variety of applications.

SUMMARY OF THE INVENTION

A method of analyzing a streaming digital composite waveform composed of multiple streaming component waves, comprising:
(a) determining the frequency and amplitude of a first streaming component wave having the highest frequency in the streaming composite waveform,
(b) generating a first simulated wave having the frequency and amplitude of the first streaming component wave, and
(c) subtracting the first simulated wave from the streaming composite waveform, to provide a first revised streaming composite waveform.

DETAILED ED DESCRIPTION OF THE EMBODIMENTS

Introduction

The present invention is a radically new approach to signal processing technology that instantly breaks down signals into their fundamental waves regardless of data size, signal movement, or harmonic relation. This type of signal processing opens up new doors of science and greatly improves the current technologies in use today.

The present invention combines traditional phasor representations and waveforms to create a three-dimensional helix to represent a composite waveform in space. By using analytic and heuristic methods, this composite wave can be broken into its fundamental parts. This invention introduces additional representations that enable gathering additional information about a composite wave and applies new tools to spectral decomposition. The method of the present embodiment enables faster and more accurate spectral decomposition by determining amplitude, frequency and phase of each of the wave components making up the composite waveform. The speed and accuracy of the present embodiment enables the application of the present invention in a broad range of fields, including voice synthesis, voice recognition and improved methods of data compression and encryption.

Quadrature View and Phasors

Figure 1A:
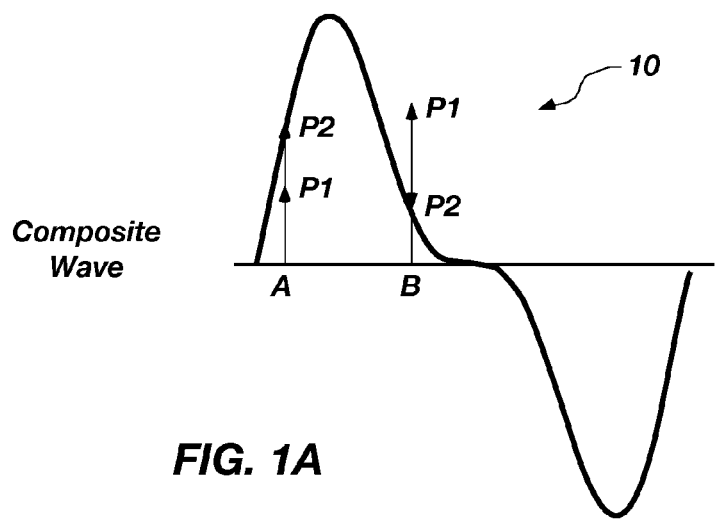
FIGS. 1A-1C are prior art representations of simple sinusoidal signals.
Figure 1B:
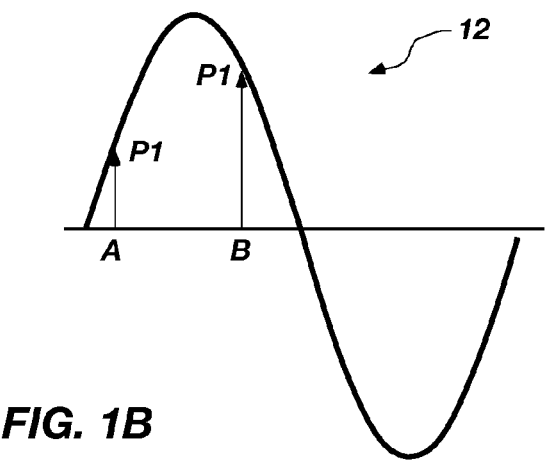
Figure 1C:
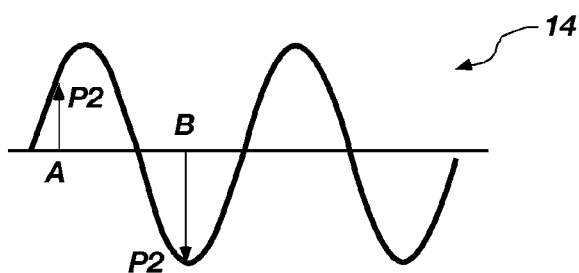
Figure 2:
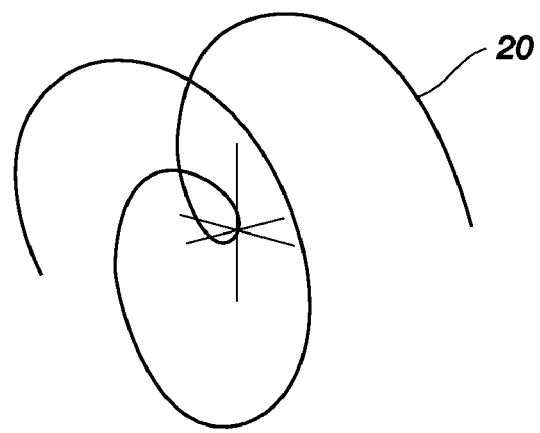
FIG. 2 is a prior art three-dimensional representation of a composite waveform.

The present invention involves analyzing a composite waveform using a helix model, as shown in FIG. 2. This composite waveform 20 is in reality similar to the waveform 10 shown in FIG. 1A. However, the two-dimensional views shown in FIGS. 1B and 1C only showed part of the waveform. By looking at a three dimensional view in FIG. 2 we can see that waveform 20 is really a helical wave that changes along the z time axis as well as along the x and y axes.

Figure 3:
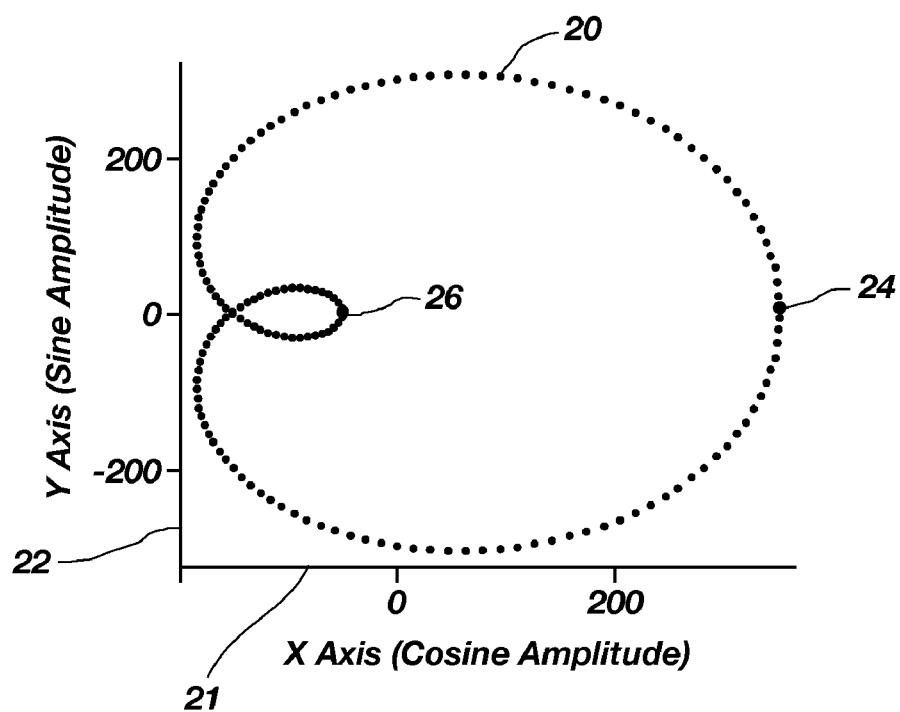
FIG. 3 is a quadrature view of a two frequency waveform.

As shown in FIG. 3, the present invention uses a quadrature view of a waveform converted to digital form, also called a barrel view, in which waveform 20 is examined at a point in time, looking at the waveform in terms of the x axis 21 and y axis 22. Each dot shown in FIG. 3 represents a digital sample point. Using simple heuristics it is possible to determine that waveform 20 is composed of two separate waves and that the frequency of one is twice the frequency of the second. More composite waveforms can be decomposed by examining the curvature and rates of changes of curvature of the 3-D waveform. The techniques of this invention can be applied to disassemble any composite waveform, such as audio, radar, sonar and TV.

Figure 4:
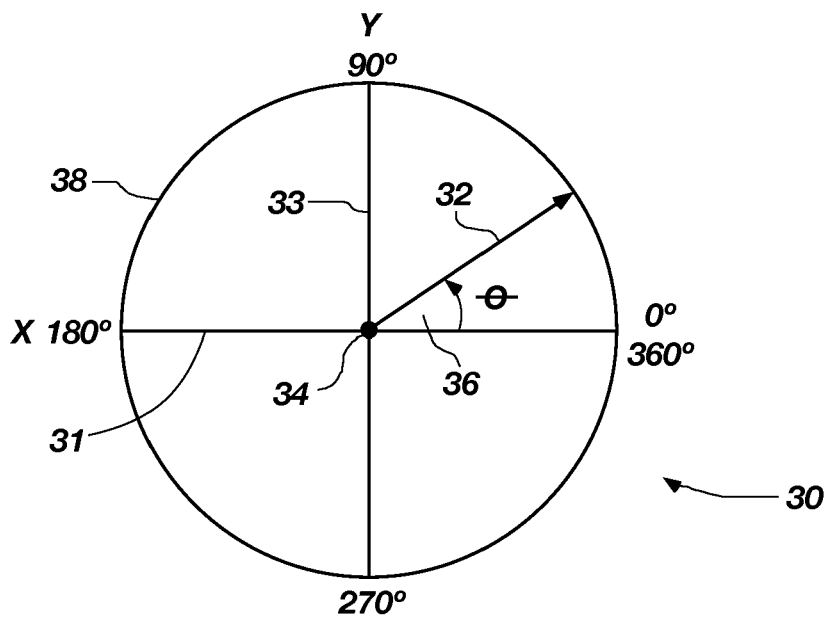
FIG. 4 is a geometric view of a one-phasor representation of a simple waveform according to the present invention.

Another way to represent the waveform 20 relative to the quadrature view in FIG. 3 is by using phasors, wherein each phasor represents a separate wave in the composite waveform 20. FIG. 4 is a simple phasor representation 30 of waveform 20 relative to the quadrature view. As used herein, the term "phasor" refers to a vector 32 with some magnitude rotating counterclockwise around a vertex or origin point 34. The term "theta" or "$\theta$" refers to an angle 36 between the x axis 31 and the phasor 32, ranging from zero degrees to wherever the phasor 32 is pointing at any instant in time. The term "omega" or "$\omega$" refers to the rate at which the phasor is changing, in other words, the delta theta or the angular velocity of the phasor. The circle 38 represents the amplitude of the phasor as it rotates.

In the present invention, an analysis of the phasor amplitude and angular velocity for each wave in a composite waveform enables a determination of the frequency and amplitude of the wave represented by the phasor. Thus, the quadrature view coupled with phasor modeling enables an analysis of each wave in a composite waveform according to the present embodiment.

Figure 5:
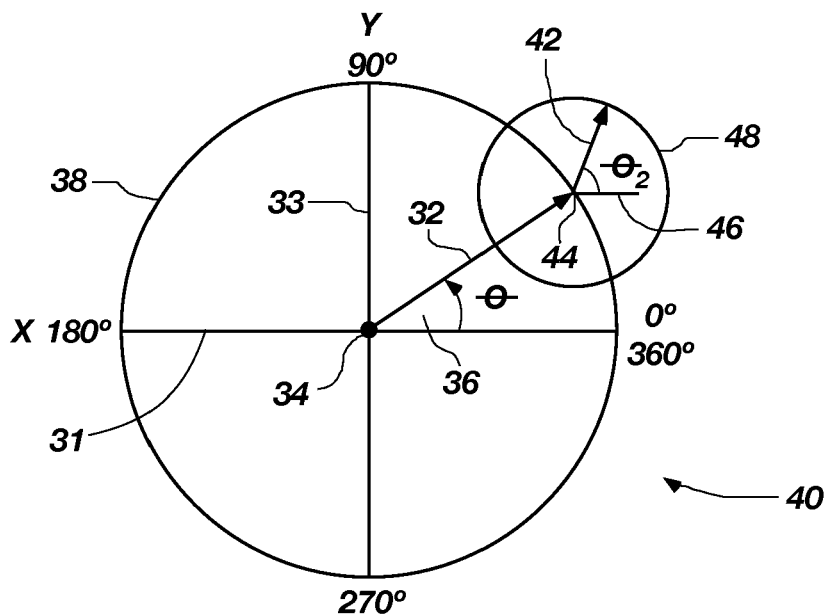
FIG. 5 is a geometric view of a two-phasor representation of a simple waveform according to the present invention.

FIG. 5 is an extension of the phasor analysis of FIG. 4, in which a two-phasor representation 40 of a waveform is given. In this view, a second phasor 42 is added representative of a second wave having a different frequency from the first wave. Phasor 42 extends from a vertex 44 at the end point of phasor 32. Phasor 42 rotates counterclockwise around vertex 44 about a circle 48 having a radius equivalent to the amplitude of phasor 42. An angle $\theta_2$ is formed between an x-axis 46 and phasor 42. Typically, the angular speed and amplitude of phasor 42 are different from those of phasor 32. In this example, the angular velocity of phasor 42 is faster than the angular velocity of phasor 32, and the amplitude of phasor 42 is less than the amplitude of phasor 32.

In this phasor analysis of waveform 20 in the quadrant view, the combination of the movements of the first phasor 32 and the second phasor 42 determine the shape of the waveform in the quadrature view. Likewise, with composite waveforms of three or more frequencies, three or more phasors can represent each frequency in a manner similar that that shown in FIG. 5. The composite waveform is a function of combining each of the frequencies and amplitudes of the separate phasors.

Referring back to the quadrature view in FIG. 3, for a two-phasor waveform, it can be intuitively seen that as the velocities and directions of component phasors 32 and 42 are collinear in the same direction at point 24, the waveform reaches a maximum point in its velocity and amplitude, because it is a combination of the velocities and amplitudes of phasors 32 and 42. Point 24 also works out to be a point of minimum curvature of the waveform 20 in the quadrature view. In contrast, when component phasors 32 and 42 are collinear in opposite directions from each other, at point 26, their velocities and amplitudes are subtracted from each other. Thus, for a two-phasor waveform, point 26 is a point of minimum velocity for the waveform 20 in the quadrature view and also a point of maximum curvature. It can also intuitively be seen that the combined vector that scribes the composite two-phasor waveform 20 shown in FIG. 3 is also collinear with each of the component phasors 32 and 42 at the same time. This fact is instrumental in establishing a general rule for analyzing composite waveforms of any number of phasors using the Xi process.

The Xi Process

The present invention may be implemented in two functionalities, referred to here as Xi Coarse and Xi Fine. Xi Coarse is a simpler procedure that may be sufficient for many applications. Where greater accuracy and specificity is needed Xi Fine may be implemented as a follow up to Xi Coarse. The first part of this application will refer only to Xi Coarse, and will be simply referred to as Xi or the Xi process.

The Xi process is a strikingly different method of signal analysis that promises to fulfill the expectations of Instantaneous Frequency Analysis. Xi has the potential to become the optimal method of real-time streaming signal analysis because of the very nature of how it works. The signal is converted from analog to digital, and measurements are made at each digital sample point as the signal is received without the need to perform transforms across an entire data set. In addition, there are no erroneous coefficients generated when trying to "window" the data.

The Xi process is a radical departure from conventional signal analysis because it does not rely solely on the use of the Fourier transform methods. Instead, Xi analyzes digital signals geometrically to break down the composite signal into each of the frequency components. These components are referred to herein as phasors, as seen in the quadrature view. Each phasor is described in terms of certain of its features, such as the amplitude and phase of each phasor on a sample by sample basis. The phasor analysis is accomplished by literally looking at the signal data (sine, cosine, and time domain) in the quadrature or barrel view to measure phasor movements between samples.

The premise behind the Xi process is that all signals are made up of independent phasors that, when added together, make up a composite signal. Phasors are vectors that are associated with rotational movement of signals in the quadrature or barrel view and follow four basic rules:

- A phasor must rotate counter-clockwise (following traditional trigonometric standards).
- Phasors stack on top of each other with the higher frequency phasors toward the top and the lower frequency phasors toward the bottom.
- A phasor that has stopped rotating appears as a DC component (or offset) to the waveform that is still propagating through time.
- Phasors can speedup or slowdown (representative of a change in frequency), grow or shrink (representative of a change in amplitude), change in phase, or appear and disappear.

As these phasors are combined into a composite quadrature digital signal they work with and against each other to scribe a composite 2-D waveform. Through careful study of these composite phasor systems it has been observed that the fine details of composite waves and thus the most significant characteristics thereof are the result of the highest frequency phasor, which rides on top of all of the other phasors. Therefore, any immediate changes in velocity or curvature from sample to sample are largely due to changes in the highest frequency phasor.

It is important to note that the digital samples of the signal data represent the composite phasor or sum of all phasors in the system added together (hereafter "Instantaneous Radius"). For purposes of definition, the Highest Frequency Phasor is defined as the phasor of the highest frequency component wave of the composite waveform. The Instantaneous Radius minus the highest frequency phasor is referred to herein as the Drift Vector. Each individual phasor has an affect, even if very little, on the angular movements of the composite quadrature signal from sample to sample. Therefore, one cannot simply measure the angular movement of the composite quadrature signal to calculate the angular frequency (or ω) of the Highest Frequency Phasor. Instead, in the present invention "Events" are identified, at which the Highest Frequency Phasor, the underlying Drift Vector, and the Instantaneous Radius are all collinear, so that the angle of the Instantaneous Radius truly represents the angle (theta) of the Highest Frequency Phasor.

It has been observed that, in a two phasor system, these Events coincide with points of minimum and maximum velocity or curvature on the composite waveform. For composite waveforms of three or more phasors, Events do not necessarily occur at points of minimum and maximum velocity or curvature of the composite waveform. However, it has been determined that the composite Instantaneous Radius vector and the underlying Drift Vector are collinear with the Highest Frequency Phasor at an Event, regardless of the number of phasors in the composite waveform, including for a two-phasor waveform.

Figure 6A:
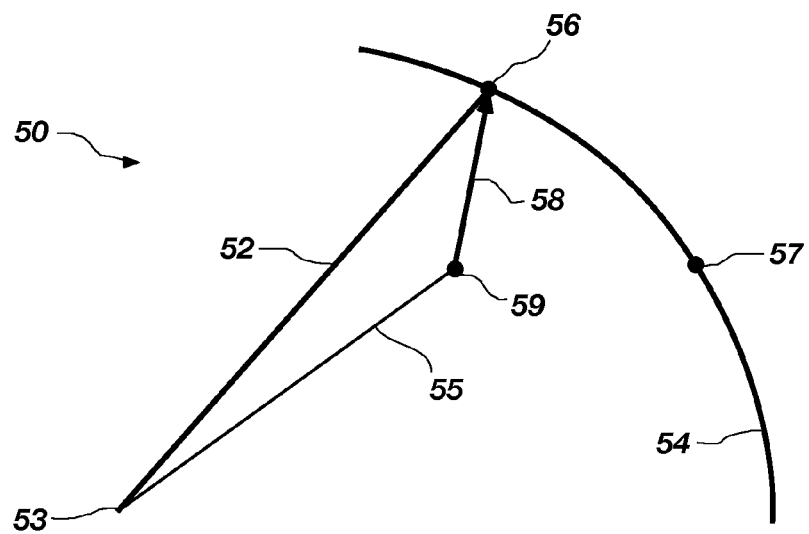
FIGS. 6A-6C show phasor views of a simple two or more phasor waveform with collinear Events occurring when the composite radius vector, the underlying Drift Vector, and the Highest Frequency phasor are all collinear.
Figure 6B:
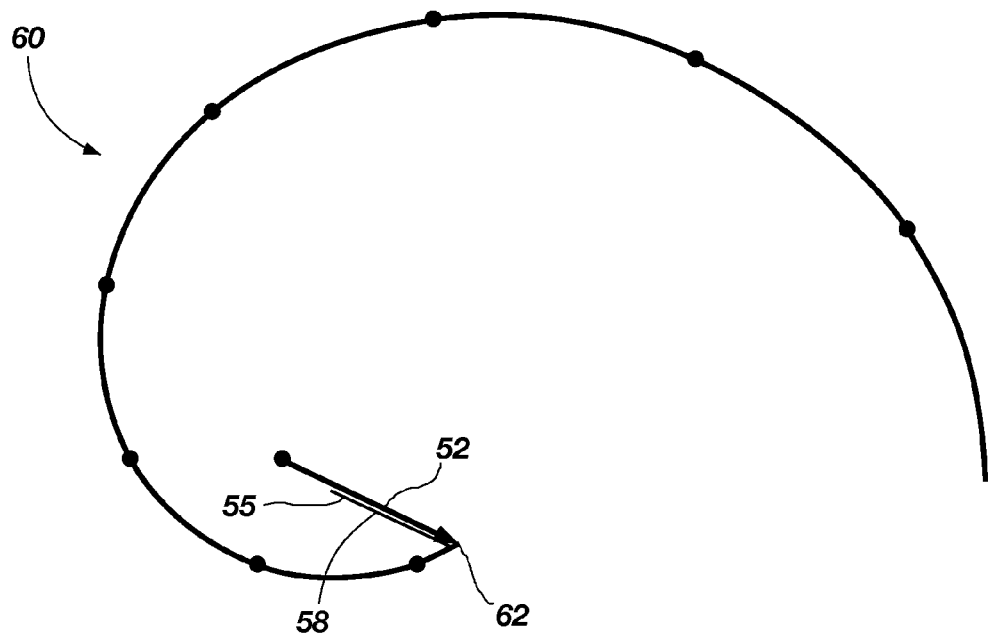
Figure 6C:
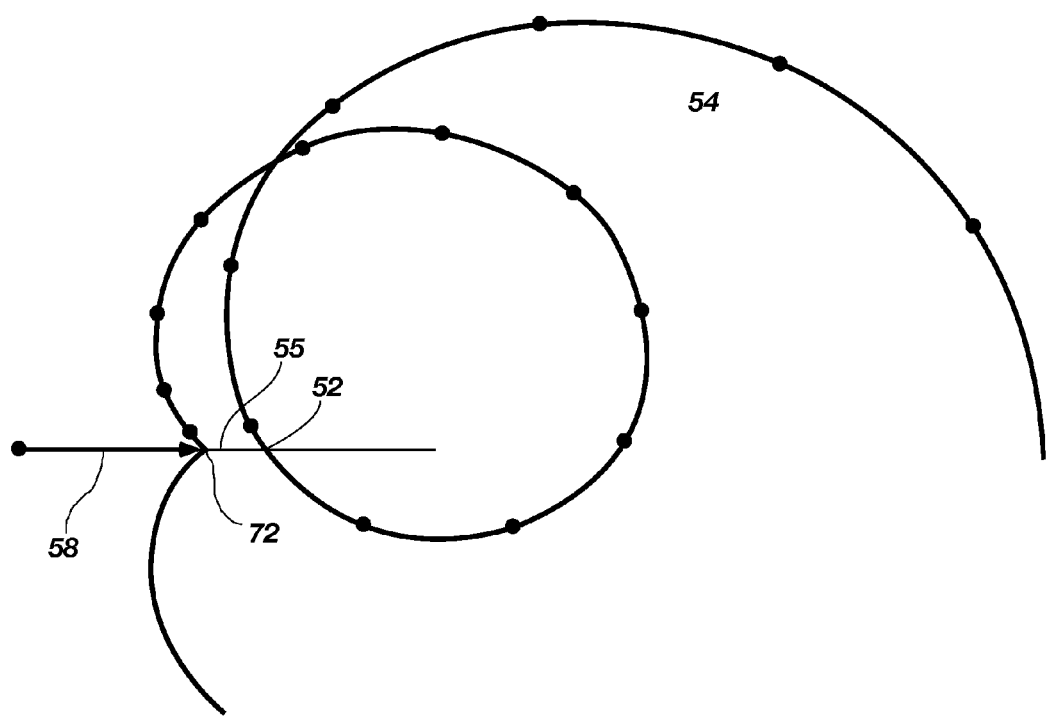

Referring to FIGS. 6A, 6B and 6C, this concept of collinearity is shown for a composite waveform having three or more phasors. In FIG. 6A, a phasor diagram 50 is shown, in which an Instantaneous Radius 52 that is rotating about a vertex 53 scribes a composite waveform 54. At an instantaneous sample point time 56, the Highest Frequency Phasor 58 is shown rotating about a vertex 59 and is oriented differently than the orientation of the Instantaneous Radius 52, as shown in FIG. 6A.

For purposes of the present invention, a line 55 between the vertex 53 and the vertex 59 is referred to as the Drift Vector, which is representative of the difference in orientation between phasor 58 and Instantaneous Radius 52. Since the Instantaneous Radius 52 and the phasor 58 are not aligned, i.e., collinear, an Event has not been reached. Note that each sample point 57 represents a point in time at which the waveform 54 is sampled by the Xi system. The sampling rate is variable, depending on the demands of the signal processing system. In one embodiment, the sampling rate is 44,100 samples per second.

Referring now to FIG. 6B, another phasor diagram 60 is shown. As Instantaneous Radius 52 continues to scribe the composite waveform 54, it reaches an Event 62 at which vector 52 is collinear with Highest Frequency Phasor 58 and in the same direction. At that point, it can be seen that the Drift Vector 55 is also collinear with Instantaneous Radius 52 and phasor 58. It can be seen that the Event 62 may or may not occur at a point of maximum or minimum curvature or velocity. However, since the Instantaneous Radius 52 and the phasor 58 are collinear, the theta angle of the Highest Frequency Phasor 58 and the theta angle of the Instantaneous Radius 52 are the same. Accordingly, the theta angle of the Highest Frequency Phasor 58 can be determined.

Looking now at FIG. 6C, another phasor diagram 70 is shown in which another Event 72 is reached as the Instantaneous Radius 52 continues to scribe the composite waveform 54. At this point, the Instantaneous Radius 52 is collinear with the Highest Frequency Phasor 58 as well as the Drift Vector 55. However, Event 72 may or may not be at a point of maximum or minimum angular velocity or curvature. At this point, the theta angle of the Instantaneous Radius 52 is exactly 180 degrees opposite to the theta angle of the Highest Frequency Phasor 58, so the theta angle of phasor 58 can be calculated from the theta angle of Instantaneous Radius 52.

Accordingly, when at least two Events have been located, the angular velocity (frequency) of the Highest Frequency Phasor can be calculated by measuring the change in theta over time between two or more Events. The amplitude of the Highest Frequency Phasor can also be determined at each of these Events by measuring the radius of an osculating circle that touches each of the points in the quadrature view where the Events occur.

Once the frequency and amplitude of the highest frequency component or phasor are known, a duplicate wave may be simulated and subtracted from the composite signal to remove the highest frequency component or phasor, similar to peeling the outer-most layer off of an onion. For this reason the process is called "peeling-the-onion." The "peeling" process is repeated for each phasor "layer" until the frequency and amplitude for all phasors are found.

Quadrature View in Detail

Although signals have traditionally been graphed in a two-dimensional sine view with amplitude in the y-axis and time in the x-axis, the reality is that a signal has inherent three-dimensional properties. To better understand this, a review of some concepts of sine, cosine, tangent, secant, and cosecant are illustrated here.

Figure 7:
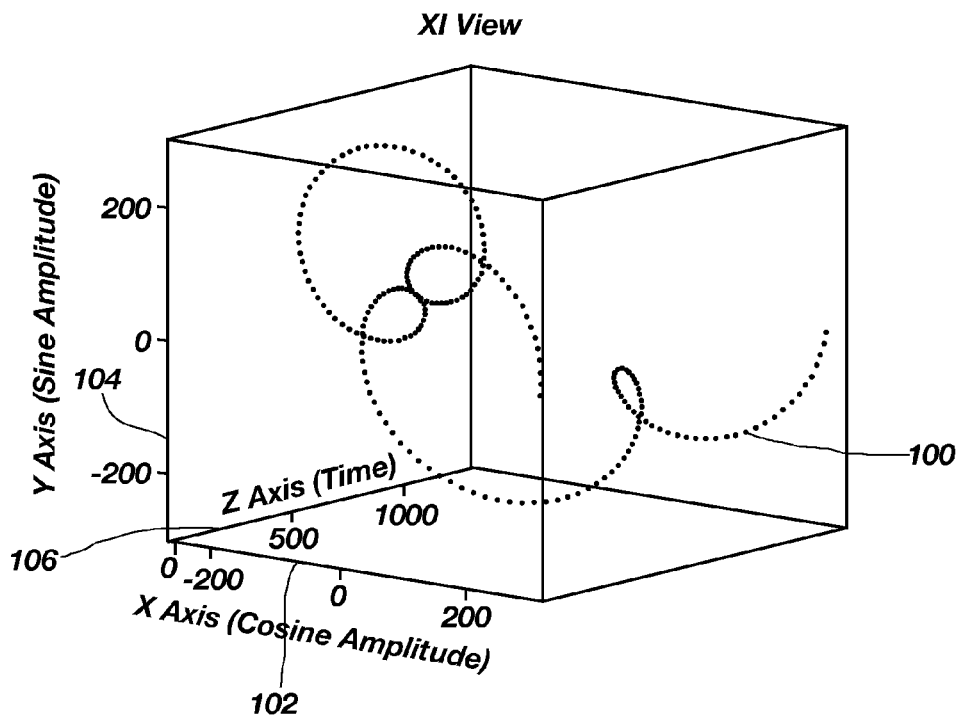
FIG. 7 is a three-dimension representation of a composite waveform.

FIG. 7 is a perspective three-dimensional graph of a signal 100 in what is referred to herein as a three-dimensional "Xi" view. ("Xi" refers to the Greek letter and the scientific notation that refers to displacement.) In this perspective view all three axes can be seen—the x, y and z axes. The x-axis 102 represents the cosine amplitudes, the y-axis 104 represents the sine amplitudes, and the z-axis 106 represents the time domain. From this view, the helical makeup of the signal can be seen.

Figure 8:
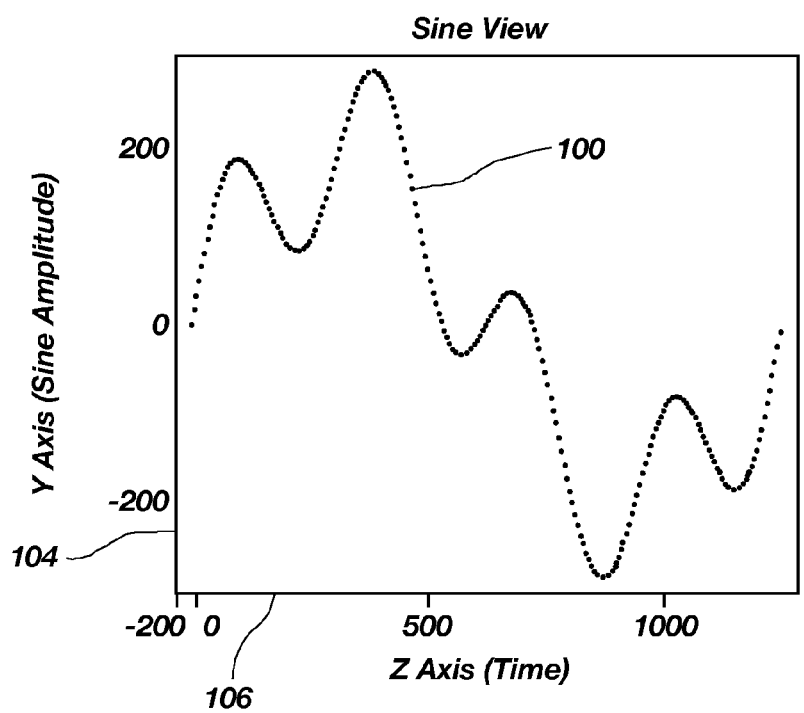
FIG. 8 is a sine view of the composite waveform shown in FIG. 6.

FIG. 8 is a sine view of signal 100 with only the y-axis 104 and z-axis 106 being visible. This view is obtained by rotating the three-dimensional representation in FIG. 7 (the Xi view) to the left along the y-axis so that only the y-axis and the z-axis are visible. This is the traditional sine view of the signal where the sine amplitude versus time is displayed. The cosine view is not visible from this perspective. This sine view is commonly displayed on oscilloscopes and is almost synonymous with audio signals.

Figure 9:
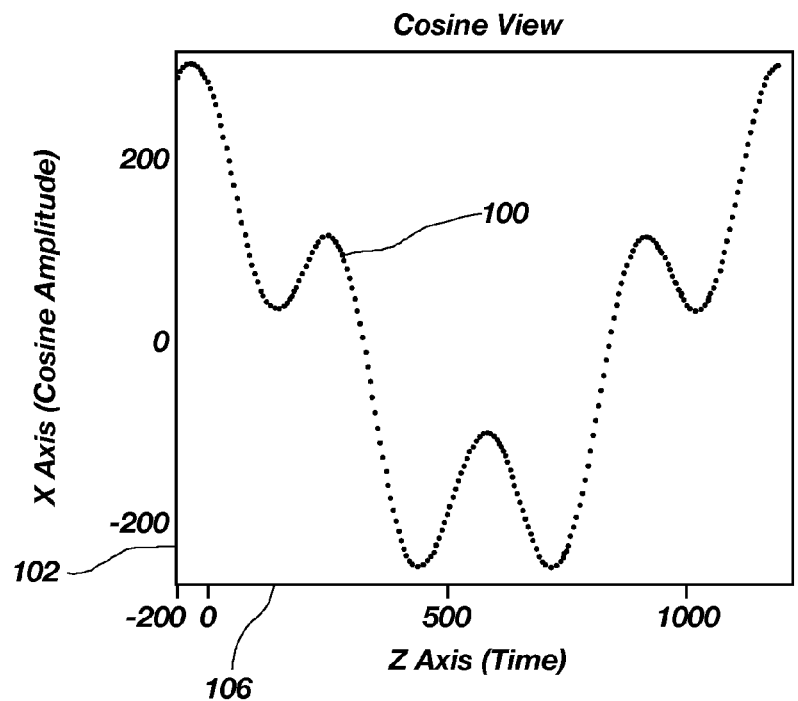
FIG. 9 is a cosine view of the composite waveform shown in FIG. 6.

FIG. 9 is a cosine view of signal 100 with only the x-axis 102 and z-axis 106 visible. This cosine view is obtained by rotating the sine view in FIG. 8 up about the z-axis 106 so that only the x-axis 102 and the z-axis 106 are visible. The sine view is not visible from this perspective.

Figure 10:
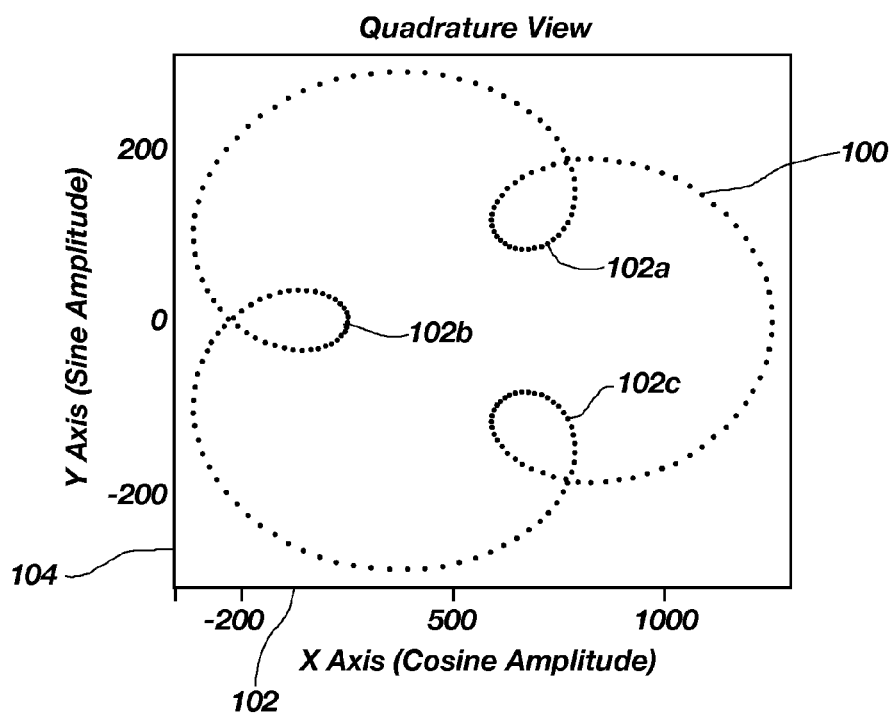
FIG. 10 is a quadrature view of the composite waveform shown in FIG. 6, according to the present invention.

FIG. 10 is the quadrature view of signal 100 in which only the x-axis 102 and the y-axis 104 are shown. This view is obtained by starting at the original three-dimensional Xi view in FIG. 7 and rotating the graph to the right along the y-axis 104 until only the x-axis 102 and the y-axis 104 are visible. In this view, there is no explicit reference to time, the z-axis 106, because the z-axis is now hidden from view. As previously mentioned, this view may also be called a "barrel" view, since it is essentially an x-axis/y-axis view of signal 100 at an instance in time, that is looking down the "barrel" of time. Each of the views in FIGS. 7-10 shows a different perspective of the same 3-D helical signal 100 (or data set).

Xi Process

The following process is described for a two-phasor waveform, in which one may use maximum and minimum velocity or curvature points as the Events for which frequency and amplitude are determined. The more general process for waveforms of any number of phasors, in which collinearity is determined will be explored in detail later.

The Xi process utilizes the quadrature view of signal 100 shown in FIG. 10 to measure phasor movement. The quadrature view is understood to be a two-dimensional graph of sine (y-axis) 104 versus cosine (x-axis) 102 as functions of a unit circle. The three loops 102a-c in the graph indicate that the composite waveform is comprised of two signals, each having its own phasor and a frequency ratio of 4 to 1.

Typically, only the sine signal data is output from most analog to digital converters (ADC). Therefore, the equivalent cosine signal data must be generated to render the quadrature view. To generate the cosine signal data from the sine signal data a Hilbert Transform (or equivalent method) may be performed. It is important to note that the Hilbert Transform must be done using a method cohesive with streaming signal data. In addition, extreme care must be taken to ensure that there are no seaming issues with the resulting cosine signal data during the transform process. It is understood that the cosine signal may be derived from the sine signal either prior to or after analog to digital conversion of the signal or signals.

For the two-phasor waveform, once the sine and cosine signal data are available, calculations can be made on the streaming data to measure sample velocity, angular velocity, curvature or other key factors from sample to sample. Any of these measurements can be used to find points where maximum/minimum Events occur and thus where the Highest Frequency Phasor is parallel (collinear) with the composite vector or phasor. For simplicity, in this example, the two phasor waveform will be measured to find the points where maximum and minimum velocity Events occur. It is understood that curvature or other key factors could be used in place of velocity.

The Xi process is begun by looking for a minimum Event. The minimum Event can be found by looking for the sample point where a velocity measurement is smaller than velocity measurements taken on samples before and after it (e.g., $V_{i-3}>V_{i-2}>V_{i-1}>V_i<V_{i+1}<V_{i+2}<V_{i+3}$). Due to the very nature of sampling, the point in time when the actual minimum Event occurs may fall between sample points. Although this may seem insignificant, it can introduce error when the frequency calculation is performed. For this reason an interpolation method is used to refine the exact time when the Event occurred.

There are many interpolation methods that can be used for this purpose, however, algorithms that use a parabolic curve (because of the sinusoidal nature of the velocity curves) have been found to yield the best results. The exact point can be interpolated by using the sample point identified earlier as the minimum Event along with the two sample points immediately to either side of it.

Once the exact interpolated point is calculated, it is stored as the point in time where the minimum Event occurred. The process is then repeated to find the maximum Event (e.g., $V_{i-3} < V_{i-2} < V_{i-1} < V_i > V_{i+1} > V_{i+2} > V_{i+3}$). After the maximum Event is interpolated it is stored as the point in time where the maximum Event occurred.

Figure 11:
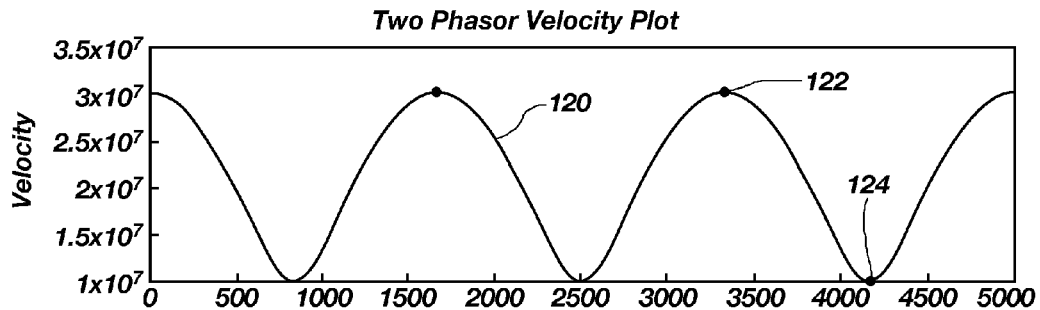
FIG. 11 shows a two phasor velocity plot, according to the present invention.

FIG. 11 shows a sample velocity plot for a two phasor input signal 120, in which the interpolated maximum and minimum Events 122, 124 are shown for signal 120. Note that there is no need for windowing using this process because measurements are made on a sample to sample basis. This greatly simplifies any required preprocessing before analysis can begin and virtually eliminates any errors that are a direct result of preprocessing. In addition, latency is greatly reduced improving the overall performance and making it possible for real-time signal analysis.

Figure 12:
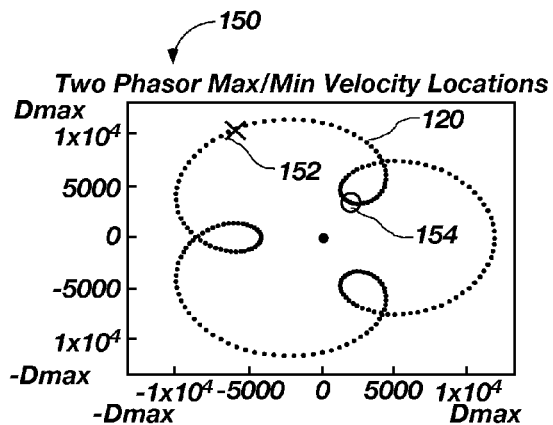
FIG. 12 shows a quadrature view of two phasor maximum and minimum velocity locations, according to the present invention.

Using the points in time for each maximum and minimum Event, the exact locations in the quadrature view where the Events occur can now be identified. Again, interpolation will be needed in this view because the exact Event locations may have occurred in between samples. FIG. 12 shows a sample quadrature graph 150 of the same two phasor signal 120 shown in FIG. 11. The locations of a maximum velocity Event 152 and a minimum velocity Event 154 are shown in FIG. 12.

Figure 13:
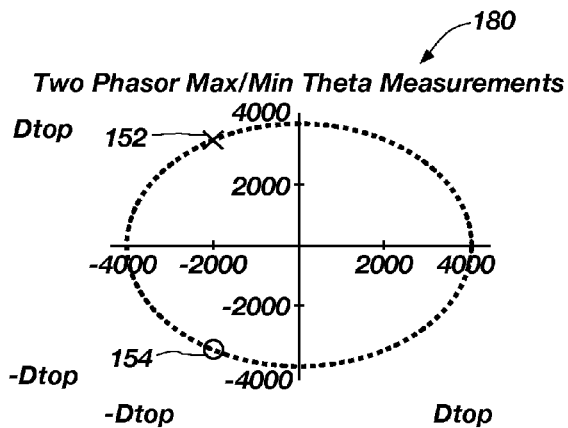
FIG. 13 shows a geometric view of two phasor maximum and minimum theta measurements, according to the present invention.
Figure 14:
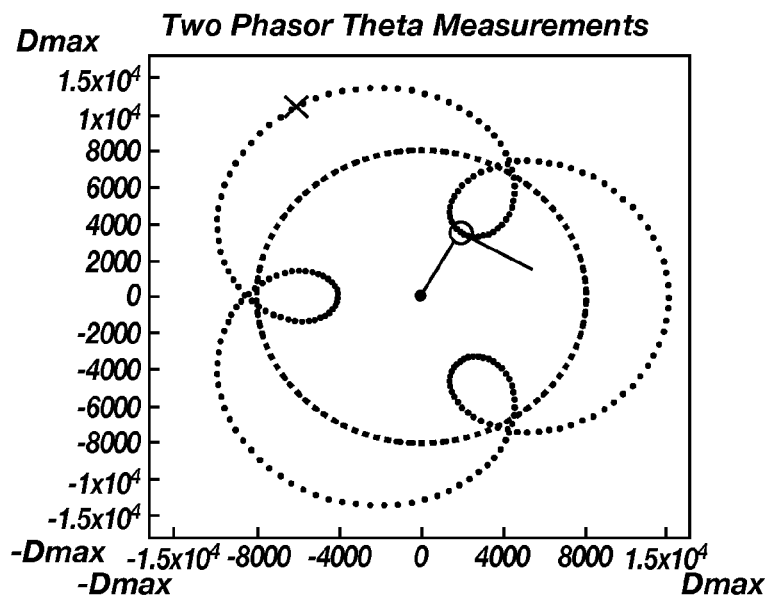
FIG. 14 shows a quadrature view of two phasor theta measurements, according to the present invention.

Looking now at FIG. 13, phasor graph 180 is shown for the two phasor signal 120. Now that the exact maximum Event point 152 and the minimum Event point 154 in the quadrature view 180 are identified, and theta (θ) of the curve at the Event point is measured. Remember that the Instantaneous Radius theta angle can be used for the theta angle of the Highest Frequency Phasor, because the Instantaneous Radius is collinear with the Highest Frequency Phasor at the Event point. FIG. 14 is included to show an example of a correct theta calculation. The formula for calculating the theta angle of the Highest Frequency Phasor is:

$$\theta = \arctan(Y/X)$$

Where:
θ=theta angle of the phasor at Event point (in degrees)
Y=the Sine sample value at the interpolated Event point.
X=the Cosine sample value at the interpolated Event point where X<>0.

For a two-phasor waveform, once the theta angle is calculated for both the minimum Event and the maximum Event points in the quadrature view, the period of the Highest Frequency Phasor can be calculated. To calculate frequency both the time measurements and the thetas for the interpolated minimum and maximum Events are needed. Note the theta measurements between minimum and maximum Events in FIG. 14. The equation to calculate frequency is:

$$f = (SR * \Delta\theta)/(\Delta S * 360)$$

Where:
f=frequency (in hertz)
SR=Sample Rate (typically 44100 samples per second)
Δθ=the change in angle (theta) moved between the minimum Event and the maximum Event
ΔS=the time elapsed between the minimum Event and the maximum Event The result of this equation gives the frequency of the Highest Frequency Phasor of waveforms 120 and 130. For a more general equation, where any number of phasors are involved, we would refer to first and second Events, rather than minimum and maximum Events.

Figure 15:
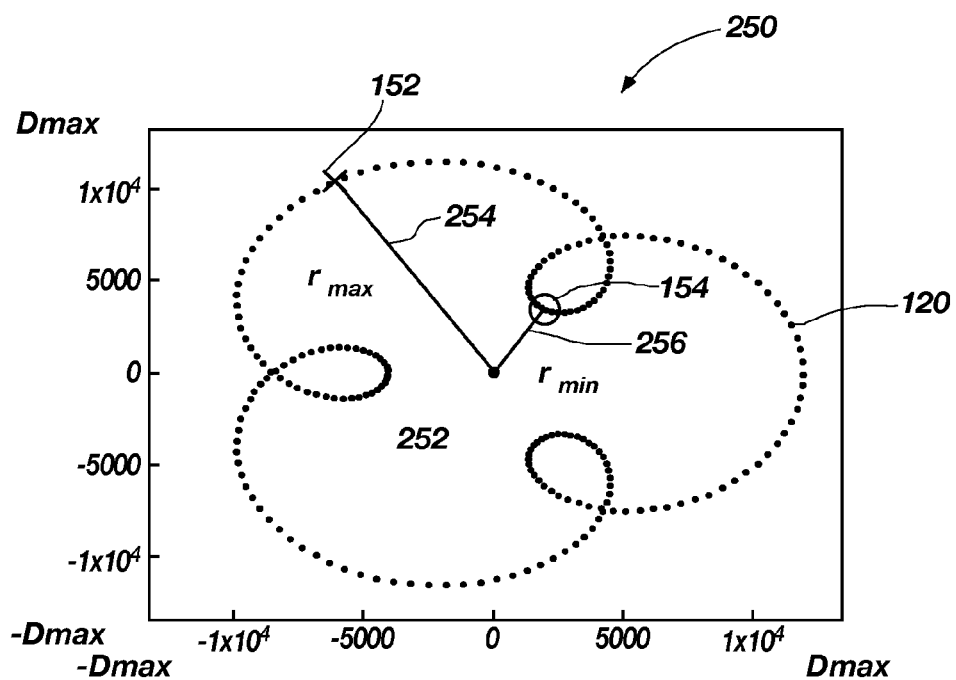
FIG. 15 shows a quadrature view of maximum and minimum radii for a two phasor waveform, according to the present invention.

Referring now to FIG. 15, the amplitude of the Highest Frequency Phasor will now be calculated for the two-phasor signal 120, using the quadrature view 250 of signal 120. The Highest Frequency Phasor amplitude is determined by measuring the radial distance $r_{max}$ 254 from the origin 252 (using Cartesian coordinates of the quadrature view) out to the maximum Event point 152. Likewise the amplitude $r_{min}$ 256 of the radial distance is measured from the origin 252 to the minimum Event point 154. These radius measurements $r_{max}$ 254 and $r_{min}$ 256, when subtracted from each other result in the peak to peak amplitude of the Highest Frequency Phasor. The peak to peak amplitude divided in half is the amplitude of the Highest Frequency Phasor.

The equation to calculate phasor amplitude is:

$$a = (r_{max} - r_{min})/2$$

Where:
a=amplitude (in DAC counts)
$r_{max}$=Radius from the origin out to the point where the maximum Event occurred
$r_{min}$=Radius from the origin out to the point where the minimum Event occurred Cancelling the Highest Frequency The frequency and amplitude of the Highest Frequency Phasor can now be used to synthesize both sine and cosine waves that will cancel out the Highest Frequency Phasor from the composite signal. However, care needs to be taken to ensure that the synthesized waves are in phase and in complete synchronization with every sample of the Highest Frequency Phasor. This can be accomplished by using the theta angles calculated for both the maximum Event and the minimum Event. To ensure synchronization between the samples of the original composite waveform and the samples of the canceling synthesized waveforms the exact number of samples between the minimum and maximum Events (non-interpolated) should be used. In the more general case, we refer to first and second Events, rather than minimum and maximum Events.

For example, taking the data points between two Xi collinear Events we have the following data about the Highest Frequency Phasor in a particular composite waveform:

TABLE 1

| | Previous Event | Current Event |
|---|---|---|
| Theta Angle | 329.999861218359 | 299.999861218359 |
| Interpolated Offset | −0.12493625429663 | −0.24999350756562 |
| Samples Between Events | 92 | 92 |
| Frequency | 440 hz | 440 hz |
| Amplitude | 100 mv | 100 mv |
| Sample Rate | 44100 samples /sec | 44100 samples/sec |

To ensure that the samples in the newly synthesized Sine and Cosine waves are synchronized with the samples of the original composite waveform the starting Theta Angle needs to be adjusted by the Interpolated Offset. This can be accomplished by using the formula:

$$\theta_{start} = \theta_{previous} - (f_{previous} * I_{offset} * 360/SR$$

Where:
$\theta_{start}$=starting Theta angle (in degrees) of the phasor
$\theta_{previous}$=interpolated Theta angle where the Xi collinear Event occurred
$f_{previous}$=the frequency measured at the previous Xi collinear Event
$I_{offset}$=The offset time from the interpolated Xi collinear Event and the nearest sample point (as a fraction of time between two sample points)
SR=Sample Rate (typically 44100 samples per second)

It is important to note at this time that the synthesized waveforms used to cancel out the highest frequency component of a composite waveform need to be synthesized as efficiently as possible. The typical "sin(ωt)" and "cos(ωt)" calculations are very expensive and time consuming for a computer or other electrical device to calculate. For this reason, a lookup table method is implemented that pre-populates a sine table containing pre-calculated sine radian values for a complete circle at very fine increments. This allows the computer or other electrical device to perform simple memory lookup operations to calculate sine and cosine sample values instead of performing costly trigonometry operations, such as using a Sine Table as discussed infra.

Once the Starting Theta angle is calculated it needs to be converted to a Register Radian pointer compatible with the SineTable method used to lookup the sine values. For example, if a 16-bit addressable lookup table is used then the Starting Theta is converted to the correct Register Radian pointer using the formula:

$$RegRad_{start} = \theta_{start} * 4294967296/360$$

Where:
$RegRad_{start}$=starting index pointer (in Register Radians) of the phasor
$\theta_{start}$=starting Theta angle (in degrees) of the phasor
4294967296=the number of addressable values using a 32-bit addressable lookup table In order to maintain accuracy, a 32 bit register can be used to keep track of the Register Radian pointer used to perform lookups into the SineTable.

With the starting Register Radian pointer calculated, a sample increment value needs to be calculated to be used to increment the Register Radian pointer for every sample to be synthesized between the Xi collinear Events. The sample increment value can be calculated using the following formula:

$$SampInc = f * 4294967296/SR$$

Where:
SampInc=the amount to increment the Register Radian pointer for each sample point to be synthesized
f=frequency (in hertz)
4294967296=the number of addressable values using a 32-bit addressable lookup table
SR=Sample Rate (typically 44100 samples per second)

At this time the Cosine Offset needs to be calculated to be able to use the SineTable to synthesize the Cosine samples. The Cosine Offset is simply ¼ the maximum possible size of the Register Radian Pointer (for a 32-bit Register Radian pointer this value is 4294967296. The Cosine Offset can simply be added to the current Register Radian pointer value to synthesize the Cosine samples.

The actual sine and cosine samples are synthesized by using the following formulae:

$$Sample_{sine} = A * SineTable[RegRad_{sine}]$$

Where:
$Sample_{sine}$=sine sample point being synthesized
A=amplitude of the sine wave being synthesized
SineTable[ ]=the SineTable containing all of the pre-calculated sine(2π) radian values
$RegRad_{sine}$=starting index pointer (in Register Radians) of the sine phasor $$Sample_{cosine} = A * SineTable[RegRad_{cosine}]$$

Where:
$Sample_{cosine}$=cosine sample point being synthesized
A=amplitude of the cosine wave being synthesized
SineTable[ ]=the SineTable containing all of the pre-calculated sine(2π) radian values
$RegRad_{cosine}$=starting index pointer (in Register Radians) of cosine the phasor By subtracting both the synthesized sine and cosine waveforms from the original composite waveform, a new waveform is created that is exactly the same as the original composite waveform only with the highest frequency component missing. This resulting wave can then be streamed through a separate buffer and the entire Xi process can be repeated again to calculate the next highest phasor's frequency and amplitude. Once the next Highest Frequency Phasor's frequency and amplitude are calculated, a wave is synthesized to cancel out that phasor and the process is repeated until all phasors are accounted for.

A SineTable is simply a lookup table that contains precalculated sin(2π) radian values for a complete circle in very finite increments. The SineTable can be any addressable size but ideally should be large enough to store sin(radian) values in small enough increments to more accurately represent the waveform being synthesized. It has been observed that a 16-bit addressable SineTable is large enough to get the needed accuracy but not require a massive amount of memory. For example, a 16-bit SineTable would represent 0.0054931640625 degrees per increment (360 deg/65536) of accuracy.

Each value stored in the SineTable should have Double Float precision meaning that a 16-bit addressable SineTable would require 524288 bytes (512 Kbytes) of memory. Although most Digital-to-Analog Converters (DACs) and Analog-to-Digital Converters (ADCs) use integer values to represent the amplitude values of each sample, the accuracy of the Double Float value in the SineTable multiplied by the amplitude maintains the accuracy of the synthesized sample point. If the synthesized sample point is converted from a float to an integer then it will equal the original sample point.

To create the SineTable a Constant is used that is calculated by taking the number of addressable values in the SineTable and dividing by 2π (i.e., 65536/2π for a 16-bit addressable SineTable). Each value in the SineTable is then calculated by taking the sine of all of the address numbers (values between 0 and the total number of addressable values in the SineTable) divided by the Constant. For example, to create a 16-bit addressable SineTable the following formulae would be used:

$$Constant = 65536/2\pi$$

Where:
Constant=the constant value used as the divisor for all addresses of the SineTable
65536=the number of addressable values using a 16-bit addressable lookup table
2π=radians in a 360 degree circle $$SineTable_n = sin(n/Constant)$$

Where:
$SineTable_n$=the nth addressable value in the SineTable
n=the element or index into the SineTable
Constant=the constant value used to divide by for all addresses of the SineTable In order to lookup a value in the SineTable an index pointer called a "Register Radian" is used. A Register Radian is simply an element or index pointer into the SineTable used to retrieve a sine(radian) value. Because the Register Radian pointer actually points to the sine(radian) value in the SineTable the accuracy of the Register Radian pointer is imperative to creating a waveform of samples with negligible error. As the Register Radian pointer is incremented sample to sample it is possible for drift to occur due to numerical noise in rounding. For this purpose a Register Radian pointer with double the precision of the total number of addressable elements in the SineTable should be used. For example, if a 16-bit addressable SineTable is implemented, then a 32-bit Register Radian pointer should be used. By dropping that last 16-bits (the Least Significant Bits (LSB)) of the Register Radian pointer a 16-bit index lookup can be performed on the SineTable.

The Register Radian pointer can be calculated by taking the angle in degrees multiplied by 2 times the number of addressable elements in the SineTable divided by 360. The formula then is:

$$RegRad_{sine} = \theta * 4294967296/360$$

Where:
  $RegRad_{sine}$=starting index pointer (in Register Radians) of the Sine phasor
  $\theta$=starting Theta angle (in degrees) of the phasor
  4294967296=the number of addressable values using a 32-bit addressable lookup table The SineTable can be used to provide both the sine and cosine sample values. The sine values are retrieved by simply using the Register Radian pointer. However, the cosine values can also be retrieved from the SineTable by adding ¼ of the Register Radian pointer size to the Register Radian pointer. The formula for the 32-bit Register Radian pointer is then:

$$RegRad_{cosine} = RegRad_{sine} + (4294967296/4)$$

Where:
  $RegRad_{cosine}$=starting index pointer (in Register Radians) of the cosine phasor
  $RegRad_{sine}$=starting index pointer (in Register Radians) of the sine phasor
  4294967296=the number of addressable values using a 32-bit addressable lookup table One of the added benefits of using a Register Radian pointer of a finite size (preferably 32-bits) is that any rollover that occurs in the phasor moving from 359 degrees to 0 degrees is automatically accounted for in the Register Radian pointer moving from 4294967296 to 0 Register Radians. This simplifies computing and eliminates any need for "If . . . Then . . . " checks.

Once the Register Radian pointer is calculated to perform a SineTable lookup the following formulae can be used to synthesize actual sine and cosine sample points:

$$Sample_{sine} = A * SineTable[RegRad_{sine}]$$

Where:
  $Sample_{sine}$=Sine sample point being synthesized
  A=amplitude of the sine wave being synthesized
  SineTable[ ]=the SineTable containing all of the pre-calculated sine($2\pi$) radian values
  $RegRad_{sine}$=starting index pointer (in Register Radians) of the sine phasor $$Sample_{cosine} = A * SineTable[RegRad_{cosine}]$$

Where:
  $Sample_{cosine}$=Cosine sample point being synthesized
  A=amplitude of the Cosine Wave being synthesized
  SineTable[ ]=the SineTable containing all of the pre-calculated sine($2\pi$) radian values
  $RegRad_{cosine}$=starting index pointer (in Register Radians) of the Cosine phasor Summary of Xi Processes Xi is capable of calculating changes in frequency, amplitude, and phase for every cycle of each phasor as those changes occur in real time. This is what allows Xi to output discrete component frequency tracks as they independently change (modulate) in frequency, amplitude and phase. This makes streaming signal analysis a reality.

Summarizing, the main elements of the Xi process for a two-phasor waveform are as follows:
1. Generate the streaming Cosine Transform of streaming sine data and convert all analog to digital signals to generate the streaming digital "Xi" view (similar to quadrature).
2. Calculate the sample velocity (curvature, angular velocity, etc., can also be used instead of velocity) for every sample in the waveform.
3. Identify Events of maximum/minimum velocity (or curvature, angular velocity, etc).
4. Interpolate the exact time and location that the maximum/minimum Events occurred.
5. Continue with acts 2-3 until another maximum/minimum Event occurs and record the interpolated time and location of that Event.
6. Calculate the frequency of the highest frequency component or phasor using the delta time and delta location between the two Events in act 3 and 4.
7. Calculate the amplitude of the Highest Frequency Phasor using the radius measurements between the origin and each of the minimum and maximum Event points.
8. Generate a canceling wave using the frequency and amplitude calculated in acts 2 thru 7 to remove the highest frequency component waveform.
9. Repeat acts 2-8 until all phasors are measured and frequencies removed.

A more general summary for any multiple of phasors in a composite waveform is:
1. Generate the streaming Cosine Transform of streaming sine data and convert all analog to digital signals to generate the streaming digital "Xi" view (similar to quadrature).
2. Identify Events of collinearity between the Highest Frequency Phasor and the Instantaneous Radius of the composite waveform.
3. Interpolate the exact time and location that the collinearity Events occurred.
4. Continue with acts 2-3 until another collinearity Event occurs and record the interpolated time and location of that Event.
5. Calculate the frequency of the Highest Frequency Phasor using the delta time and delta location between the two Events in act 2 and 4.
6. Calculate the amplitude of the Highest Frequency Phasor using the radius measurements between the origin and each of the collinearity Event points.
7. Generate a canceling wave using the frequency and amplitude calculated in acts 2 thru 6 to remove the highest frequency component waveform.
8. Repeat acts 2-7 until all phasors are measured and frequencies removed.

As described herein, the Xi process is capable of calculating changes in frequency, amplitude, and phase for every cycle of each phasor as those changes occur, in real time. This allows Xi to output discrete component frequency tracks as they independently change (modulate) in frequency, amplitude, and phase. This ability makes streaming signal analysis a reality. The Xi process advantages include being able to breakdown a waveform to the sample points, being able to distinguish between frequencies that are very close together, such as about 3-9 hertz apart, and providing sample-by-sample modulation information for all components of a composite waveform.

Example of Xi Process

Figure 16:
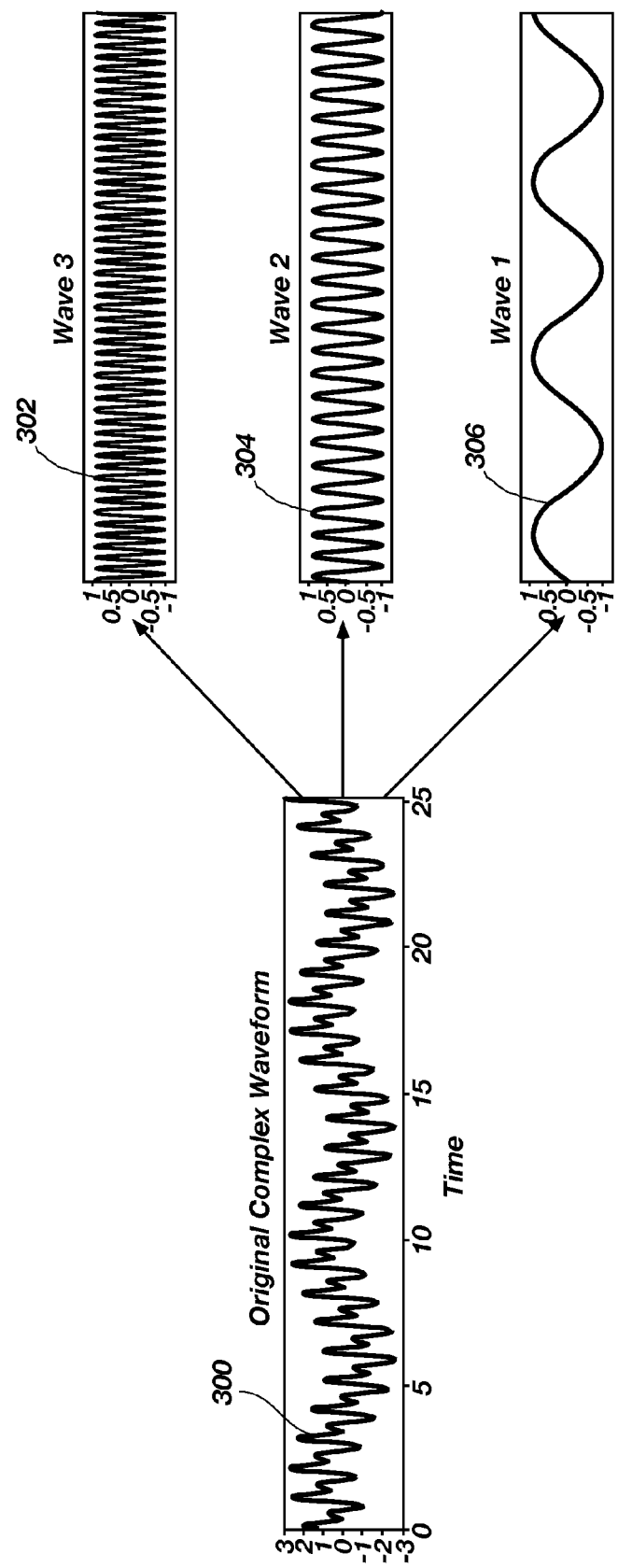
FIG. 16 is a diagrammatic representation of separating a composite waveform into its wave components, according to the present invention.
Figure 17:
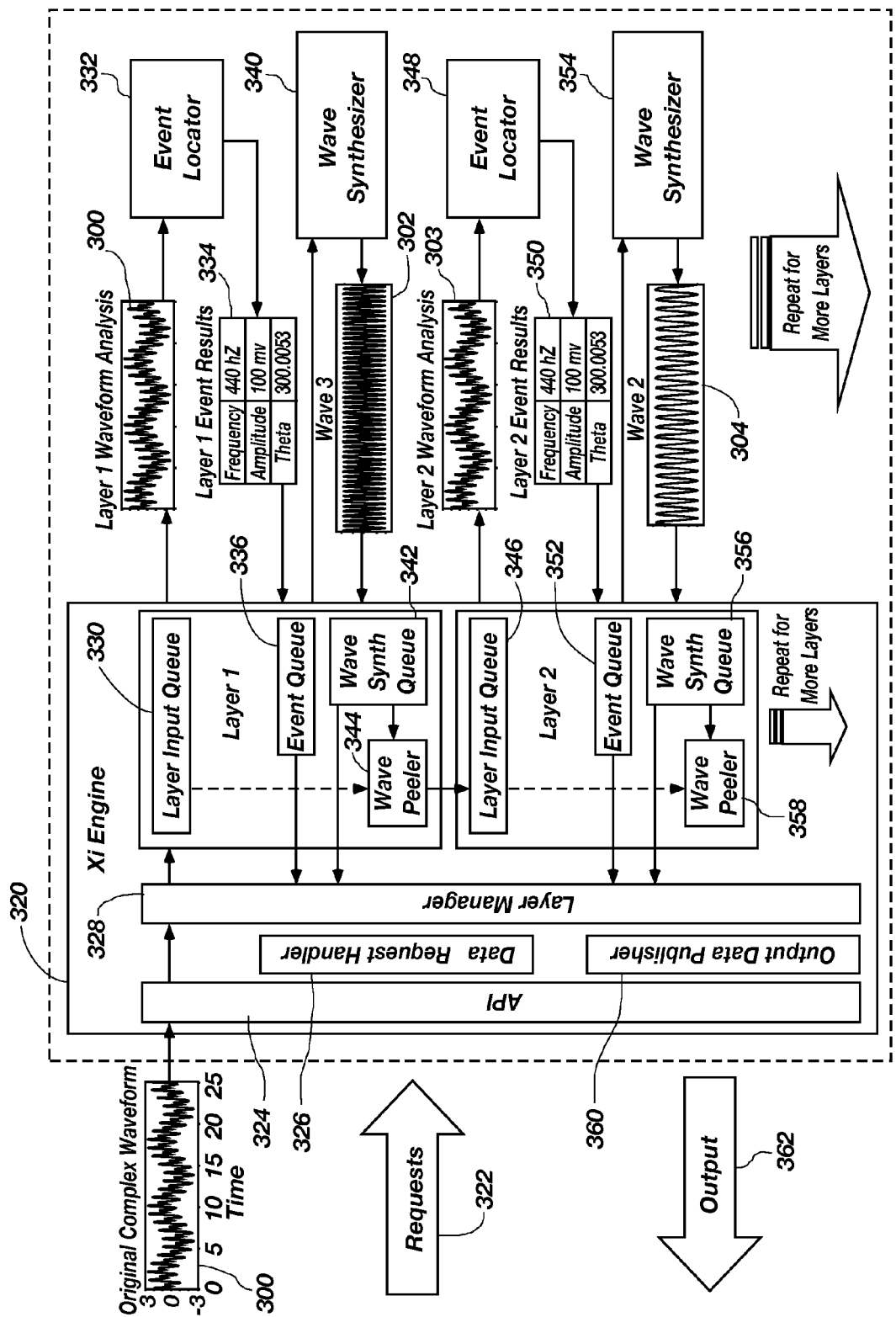
FIG. 17 is a diagrammatic representation of a system for composite waveform analysis, according to the present invention.

FIGS. 16 and 17 provide an example of the Xi process. As shown in FIG. 16, an original composite waveform 300 is presented for analysis. For purposes of this example, waveform 300 has already been converted to a digitally sampled signal. The frequency and amplitude of the highest frequency component or wave 302 are determined using the above process. The wave 302 is then synthesized and subtracted from waveform 300. The process is repeated, first for the next highest frequency wave 304 and last for the lowest frequency wave 306.

FIG. 17 shows the Xi process in more detail. The original composite waveform 300 is presented to a Xi engine 320, which could be software, hardware or a combination of the two. A request 322 for data output is also presented. The digital waveform 300 passes through an API 324, a data request handler 326 and a layer manager 328. After lining up in a layer input queue 330, waveform 300 is passed to a layer 1 Event locator 332, that carries out the Xi process to determine the characteristics 334 of the Highest Frequency Phasor. In the present example, the characteristics of the Highest Frequency Phasor are given as follows: frequency 440 hertz, amplitude 100 mv and theta 300.0053.

This wave information is passed through an Event queue 336 to the layer manager 328 for storage. The highest frequency characteristics are also passed to a layer 1 wave synthesizer 340 for generation wave 302 from the wave characteristics 334. Wave 302 is passed through a wave synthesis queue 342 to a wave peeler 344 that strips wave 302 from waveform 300. The resulting waveform 303 is passed to a layer input queue 346 and then to a layer 2 Event locator 348.

The Xi process is again carried out, and the characteristics 350 of waveform 304 are generated. As shown in this example, waveform 304 has a frequency of 200 hz, an amplitude of 200 mv and a theta of 175.874. This information is passed through an Event queue 352 to the layer manager for storage. It is also passed to a layer 2 wave synthesizer 354 to generate wave 304, which passes through a wave synthesis queue 356 to a wave peeler 358.

The above process is repeated for as many additional waves that may comprise the waveform. The resulting data regarding all of the wave components to the initial waveform 300 are passed to the layer manager 328 and eventually through an output data publisher 360 and API 324 as output data 362.

Although the above embodiments are representative of the present invention, other embodiments will be apparent to those skilled in the art from a consideration of this specification and the appended claims, or from a practice of the embodiments of the disclosed invention. It is intended that the specification and embodiments therein be considered as exemplary only, with the present invention being defined by the claims and their equivalents.

What is claimed is:

1. A method of analyzing a streaming composite waveform composed of multiple streaming component waves, comprising:

determining, by phasor analysis using a digital computer, the frequency and amplitude of a first streaming component wave having the highest frequency in the streaming composite waveform;

generating, by the digital computer, a first simulated wave having the frequency and amplitude of the first streaming component wave; and subtracting, by the digital computer, the first simulated wave from the streaming composite waveform, to provide a first revised streaming composite waveform.

2. The method of claim 1, further comprising:

determining, by phasor analysis using the digital computer, the frequency and amplitude of a second streaming components wave having the highest frequency in the first revised streaming composite waveform; and generating, by the digital computer, a second simulated wave having the frequency and amplitude of the second streaming component wave; and subtracting, by the digital computer, the second simulated wave from the first revised streaming composite waveform, to provide a second revised streaming composite waveform.

3. The method of claim 1, wherein the frequency of the first streaming component wave is calculated by determining first and second locations on the streaming composite waveform where the highest frequency phasor is collinear with the Instantaneous Radius vector of the streaming composite waveform.

4. The method of claim 3, wherein the first and/or second locations are determined by interpolating between sample digital sample points adjacent to the first and/or second locations.

5. The method of claim 3, wherein theta angles and times at the first and second locations are subtracted from each other to determine the frequency of the first streaming component and wave having the highest frequency in the streaming composite waveform.

6. The method of claim 1, wherein the amplitude of the first streaming component wave is calculated by determining radii lengths from a center point to a maximum point and a minimum point in a quadrature view of the streaming composite waveform.

7. The method of claim 6, wherein the amplitude of the first streaming component wave is calculated by subtracting the length of the radius from the center point to the minimum point from the length of the radius from the center point to the maximum point.

8. A method of analyzing a streaming digital composite waveform having multiple sample points and being composed of multiple streaming digital frequency components, comprising:

generating, by a digital computer, streaming digital sine and cosine waveforms representative of the streaming digital composite waveform;

generating, by the digital computer, digital quadrature data with multiple sample points being representative of the streaming digital composite waveform using the streaming digital sine waveform and the streaming digital cosine waveforms;

determining, by the digital computer, a highest frequency component of the multiple streaming digital frequency components using the multiple sample points in the digital quadrature data; and determining, by the digital computer, the amplitude of the highest frequency component using the multiple sample points in the digital quadrature data.

9. The method of claim 8, wherein the highest frequency component is determined by:

determining, by the digital computer, a value of a parameter for multiple samples of the digital quadrature data;

determining, by the digital computer, a first location of collinearity of the parameter at a first time;

determining, by the digital computer, a second location of a collinearity of the parameter at a second time; and comparing, by the digital computer, the first time at the first location with the second time at the second location to determine a highest frequency of the multiple streaming digital frequency components.

10. The method of claim 8, wherein the highest frequency component is determined using the formula:

$$f=(SR*\Delta\Theta)/(\Delta S*360)$$

Where:
f=frequency (in hertz)
SR=Sample Rate (typically 44100 samples per second)
Θ=theta angle of the phasor at Event point (in degrees)
ΔΘ=the change in Θ between a first Event and a second Event
ΔS=the time elapsed between the first Event and the second Event.

11. The method of claim 8 wherein the amplitude of the highest frequency component is determined by:
   determining, by digital computer, a first length of a radius from a center point to a maximum point in the digital quadrature data;
   determining, by digital computer, a second length of a radius from a center point to a minimum point in the digital quadrature data; and
   comparing, by digital computer, the first and second lengths.

12. The method of claim 8 wherein the amplitude of the highest frequency component is determined by the following formula:

$$a=(r_{max}-r_{min})/2$$

where:
a=amplitude (in DAC counts)
$r_{max}$=Radius from the origin out to the point where the maximum Event occurred
$r_{min}$=Radius from the origin out to the point where the minimum Event occurred.

13. The method of claim 8, further comprising generating a simulated waveform substantially equivalent to the highest frequency component, and subtracting the simulated waveform from the streaming digital composite waveform, resulting in a revised streaming digital composite waveform.

14. The method of claim 9, further comprising repeating, until all frequency components have been analyzed in the streaming digital composite waveform, the acts of:
   generating, by the digital computer, the digital quadrature data;
   determining, by the digital computer, the highest frequency component of the multiple streaming digital frequency components; and
   determining, by the digital computer, the amplitude of the highest frequency component.

15. The method of claim 13, wherein the simulated waveform is generated so that a synthesized frequency component is in phase and in synchronization with every sample of the highest frequency component.

16. The method of claim 15, wherein the samples of the streaming digital composite waveform and the samples of the simulated waveform are synchronized so that a number of samples between a first Event and a second Event are the same.

* * * * *